US012625456B2

(12) United States Patent
Fuse et al.

(10) Patent No.: US 12,625,456 B2
(45) **Date of Patent: *May 12, 2026**

(54) IMAGE FORMING APPARATUS AND MANUFACTURING METHOD FOR FRAME OF IMAGE FORMING APPARATUS

(71) Applicant: CANON KABUSHIKI KAISHA, Tokyo (JP)

(72) Inventors: Yasuhiko Fuse, Shizuoka (JP); Yoji Misao, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 18/788,984

(22) Filed: Jul. 30, 2024

(65) Prior Publication Data

US 2024/0385565 A1 Nov. 21, 2024

Related U.S. Application Data

(63) Continuation of application No. 18/325,764, filed on May 30, 2023, now Pat. No. 12,078,951.

(30) Foreign Application Priority Data

Jun. 3, 2022 (JP) ................................ 2022-090633

(51) Int. Cl.
*G03G 15/00* (2006.01)
*G03G 21/16* (2006.01)

(52) U.S. Cl.
CPC ..... *G03G 21/1619* (2013.01); *G03G 21/1647* (2013.01); *G03G 2221/1678* (2013.01)

(58) Field of Classification Search
CPC ............... G03G 15/00; G03G 21/1619; G03G 21/1647; G03G 21/1678
USPC ........................................ 399/107, 110, 111
See application file for complete search history.

(56) References Cited

U.S. PATENT DOCUMENTS

| | | | | |
|---|---|---|---|---|
| 6,678,487 | B2 * | 1/2004 | Tashiro | G03G 15/00 399/107 |
| 11,281,148 | B2 * | 3/2022 | Seto | G03G 21/1619 |
| 12,078,951 | B2 * | 9/2024 | Fuse | G03G 21/1619 |

* cited by examiner

*Primary Examiner* — Hoan H Tran
(74) *Attorney, Agent, or Firm* — Canon U.S.A., Inc. IP Division

(57) ABSTRACT

An image forming apparatus includes an image forming unit configured to form an image on a recording material, a first metal plate and a second metal plate that face each other to sandwich the image forming unit, and a third metal plate that is located between the first metal plate and the second metal plate and is joined to the first metal plate and the second metal plate. The first metal plate and the third metal plate are welded together at a plurality of welding positions, an adhesive is applied to between the first metal plate and the third metal plate in a range sandwiched between two welding positions of the plurality of welding positions in a region where the first metal plate and the third metal plate are in contact with each other, and the first metal plate and the third metal plate are thereby joined together.

6 Claims, 17 Drawing Sheets

IMAGE FORMING APPARATUS AND MANUFACTURING METHOD FOR FRAME OF IMAGE FORMING APPARATUS

CROSS REFERENCE OF RELATED APPLICATIONS

This application is a continuation of U.S. patent application Ser. No. 18/325,764, filed May 30, 2023 which claims the benefit of priority from Japanese Patent Application No. 2022-090633, filed Jun. 3, 2022, which are hereby incorporated by reference herein in their entirety.

BACKGROUND

Field of the Disclosure

The present disclosure relates to a frame of an image forming apparatus.

Description of the Related Art

An electrophotographic image forming apparatus has an image formation unit that forms an image on a recording material and a frame (also called frame body) that supports a conveyance unit for conveying a sheet. It is widely known that the frame has a structure with a plurality of metal plates fastened and assembled by screws. In such a structure, the low rigidity of the frame may result in image failures, such as distortion and misalignment of colors, in an image formed in the sheet. In order to achieve the rigidity of the frame sufficient for an image forming apparatus, some measures for improving the rigidity of the frame are taken by, for example, increasing in number the screw-fastening places in the metal plates and/or thickening the metal plates.

Meanwhile, Japanese Patent Application Laid-Open No. 2003-66670 discusses a technique in which a plurality of metal plates is joined together by an adhesive to assembly a frame of an image forming apparatus, for example. Japanese Patent Application Laid-Open No. 2021-071699 discusses a technique in which a frame of an image forming apparatus is assembled by a combination of two methods, screw fastening and an adhesive. In such a manner, assembling a frame by using an adhesive achieves weight reduction of the frame due to the use of fewer screws.

However, joining a plurality of metal plates by an adhesive may have the disadvantage described below. In general, an adhesive strength is not high against force acting in the peeling direction. Thus, in the case of joining a plurality of metal plates by an adhesive, the rigidity of the frame in the peeling direction of the adhesive is to be made up by, for example, a screw fastening method.

Japanese Patent Application Laid-Open No. 2021-071699 discusses a configuration in which metal plates are fastened together with screws near the adhesive application positions, thus preventing the adhesive from peeling. According to the configuration discussed in Japanese Patent Application Laid-Open No. 2021-071699, the use of an adhesive reduces the number of screws as compared to the typical technique. However, there has been a demand for further weight reduction of a frame in recent years.

SUMMARY

Aspects of the present disclosure provide, in a structure with a frame of an image forming apparatus assembled by using an adhesive, achieving weight reduction of the frame while securing the rigidity of the frame in the peeling direction of the adhesive.

According to an aspect of the present disclosure, an image forming apparatus includes an image forming unit configured to form an image on a recording material, a first metal plate and a second metal plate that face each other to sandwich the image forming unit, and a third metal plate that is located between the first metal plate and the second metal plate and is joined to the first metal plate and the second metal plate. The first metal plate and the third metal plate are welded together at a plurality of welding positions, an adhesive is applied to between the first metal plate and the third metal plate in a range sandwiched between two welding positions of the plurality of welding positions in a region where the first metal plate and the third metal plate are in contact with each other, and the first metal plate and the third metal plate are thereby joined together.

Further features of the present disclosure will become apparent from the following description of embodiments with reference to the attached drawings.

DESCRIPTION OF THE EMBODIMENTS

General Configuration of Image Forming Apparatus

Figure 1:
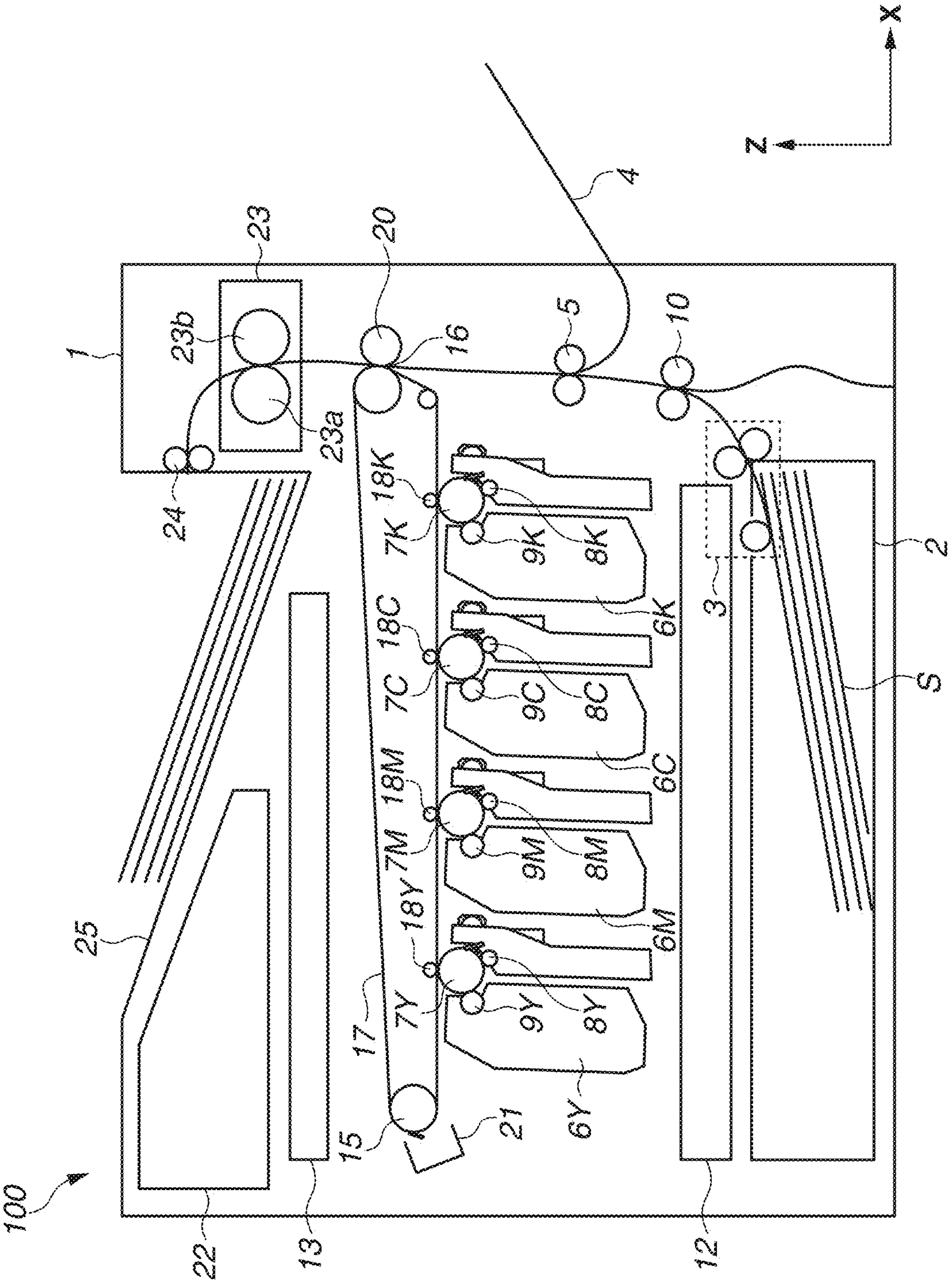
FIG. 1 is a cross-sectional view of an overall configuration of an image forming apparatus.

A first embodiment of the present disclosure will be described below. FIG. 1 is a cross-sectional view of a general configuration of an image forming apparatus 100 in the present embodiment. The image forming apparatus 100 in the present embodiment is a laser beam printer capable of printing a color image on a sheet S.

In the following description, the height direction (vertical direction) of the image forming apparatus 100 placed on a horizontal plane is defined as Z direction. A direction crossing the Z direction and parallel to the axial direction of a photosensitive member 7 described below (main scanning direction) is defined as Y direction. A direction crossing the Y direction and the Z direction is defined as X direction. It is desirable that the X direction, the Y direction, and the Z direction vertically cross with each other. For the sake of convenience, the plus side in the X direction is called right side, the minus side in the X direction is called left side. The plus side in the Y direction is called front side or frontal side, and the minus side in the Y direction is called back side or rear side. The plus side in the Z direction is called upper side and the minus side in the Z direction is called lower side.

The image forming apparatus 100 includes an apparatus main body 1, a cassette 2 that stores sheets S and is attachable to and detachable from the apparatus main body 1, and a sheet feeding unit 3. The sheets S stored by the sheet feeding unit 3 in the cassette 2 are fed one by one onto a conveyance path, and are delivered to registration rollers 5 via intermediate conveyance rollers 10. The registration rollers 5 correct the skew of the sheet S. The image forming apparatus 100 further includes a manual sheet feeding unit 4.

The image forming apparatus 100 has four image forming units 6Y, 6M, 6C, and 6K corresponding to yellow, magenta, cyan, and black. Hereinafter, for the sake of simplification, these image forming units will be described as image forming units 6 without alphabets. Other members will be described in a similar manner. The image forming units 6 have photosensitive members 7Y, 7M, 7C, and 7K (photosensitive members 7), charging units 8Y, 8M, 8C, and 8K (charging units 8) that electrically charge the surfaces of the photosensitive members 7. The image forming units 6 further include developing units 9Y, 9M, 9C, and 9K (developing units 9) that develop electrostatic latent images formed on the photosensitive members 7 by the use of toner. These photosensitive members 7 and developing units 9 are held in one container and are integrated to constitute a cartridge attachable to and detachable from the apparatus main body 1.

The image forming apparatus 100 has an optical scanning unit (scanner unit) 12 that scans the photosensitive members 7 with light in accordance with image information. The optical scanning unit 12 is provided under the photosensitive members 7 in the vertical direction (Z direction).

The optical scanning unit 12 in the present embodiment is a laser scanner unit that deflects laser light emitted from a semiconductor laser with a rotational polygon mirror to scan the photosensitive members 7.

An intermediate transfer unit 15 is provided above the developing units 9. Toner images formed on the photosensitive members 7 are transferred onto an intermediate transfer belt 17 that is a rotatable endless belt and is stretched over a plurality of stretch rollers. Primary transfer rollers 18Y, 18M, 18C, and 18K (primary transfer rollers 18) are in contact with the inner surface of the intermediate transfer belt 17. The respective primary transfer rollers 18 form primary transfer parts together with the corresponding photosensitive member 7 with the intermediate transfer belt 17 in between. At each primary transfer part, a voltage is applied to the primary transfer roller 18 to transfer a toner image from the photosensitive member 7 onto the intermediate transfer belt 17. The intermediate transfer belt 17, the plurality of stretch rollers on which the intermediate transfer belt 17 is stretched, and the plurality of primary transfer rollers 18 are unitized as the intermediate transfer unit 15 and are attachable to and detachable from the apparatus main body 1.

A secondary transfer roller 20 is in contact with the intermediate transfer belt 17 and forms a secondary transfer part 16 together with an opposing roller, with the intermediate transfer belt 17 in between. At the secondary transfer part 16, the toner images having been transferred onto the intermediate transfer belt 17 are secondarily transferred onto the sheet S. After the secondary transfer process, a cleaning unit 21 removes the residual toner on the intermediate transfer belt 17. The toner removed by the cleaning unit 21 is conveyed to a toner collection container 22 by a waste toner conveyance unit not illustrated. Arranged above the intermediate transfer unit 15 and under the toner collection container 22 is a high-voltage power supply substrate 13 for generating a voltage to be applied to the charging units 8, the developing units 9, the primary transfer rollers 18, the secondary transfer roller 20, and others.

The sheet S onto which the toner image has been transferred at the secondary transfer part 16 is conveyed to a fixing unit 23. The fixing unit 23 includes a heating unit 23*a* with a heat source and a pressure roller 23*b* that forms a fixing nip portion together with the heating unit 23*a*. The sheet S bearing the unfixed toner image is sandwiched and conveyed at the fixing nip part while the toner image is heated and fixed to the sheet S.

The sheet discharge tray 25 is provided above the intermediate transfer belt 17 and supports the sheet S discharged from the inside of the apparatus main body 1. The sheet S to which the toner image has been transferred at the secondary transfer part 16 is conveyed to a sheet discharge roller pair 24 via the fixing unit 23, and is discharged by the sheet discharge roller pair 24 to the sheet discharge tray 25.

(Frame of Image Forming Apparatus)

Figure 2:
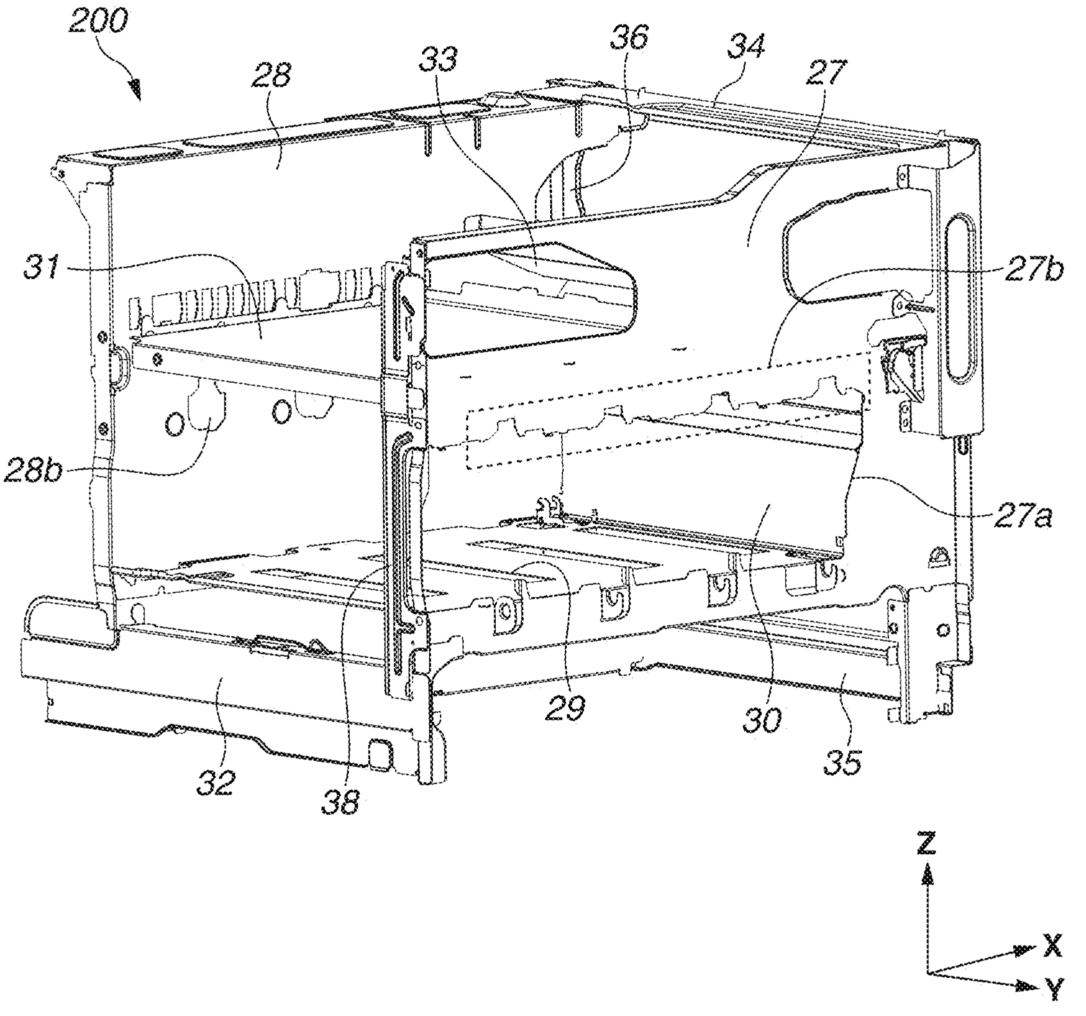
FIG. 2 is a three-dimensional view of a frame of the image forming apparatus.

Next, a frame 200 (also called frame body) of the image forming apparatus 100 will be described in detail with reference to FIG. 2.

The frame 200 includes a front side plate 27 (first metal plate) and a back side plate 28 (second metal plate) arranged in parallel, and a plurality of stays (third metal plate) suspended between the both side plates. The both side plates and the stays are all made of metal plates.

The front side plate 27 has a large hole 27*a* through which a cartridge (image forming unit 6) is insertable and removable from the front side of the apparatus. The cartridge is guided into the inside of the image forming apparatus 100 by a cartridge rail (not illustrated) provided in a main stay 29. The cartridge is then pressed upward (from the minus side to the plus side in the Z direction) by a biasing member, such as a spring, provided on the cartridge rail. Thus, a positioning part (not illustrated) of the cartridge in the longitudinal direction is brought into contact with a recess 27*b* of the front side plate 27 surrounded by a dotted line in FIG. 2, thus accurately positioning the cartridge. The back side plate 28 has a similar recess 28*b*. Accurately determining the relative positions of the both side plates enhances the position accuracy of the cartridge.

A unit that holds the intermediate conveyance rollers 10 and the registration rollers 5 (both are illustrated in FIG. 1) are attached to a feed stay 30 to support part of the conveyance path of the sheet S. A substrate stay 31 has a high-voltage power supply substrate 13 (illustrated in FIG.

1) attached thereto. Fixing the high-voltage power supply substrate 13 by metal screws to the substrate stay 31 ensures the grounding (earthing) of the high-voltage power supply substrate 13.

A left lower stay 32 includes therein a positioning part (not illustrated) for attaching the optical scanning unit 12 (illustrated in FIG. 1). The optical scanning unit 12 is attached to bridge between a portion of the feed stay 30 and the left lower stay 32. A fixing lower stay 33 is arranged under the fixing unit 23. A right upper stay 34 and a right lower stay 35 are shaped to hold exterior components (not illustrated) of the image forming apparatus 100. A right back pillar 36 and a left front pillar 38 are connected to other members to supplement the rigidity of the frame 200.

(Frame Assembly Process)

Next, N a process of assembling the frame 200 (manufacturing method) will be described with reference to the flowchart of FIG. 3. The assembly process of the frame 200 described in FIG. 3 is roughly divided into an application process of applying an adhesive and a welding process of assembling and welding together the metal plates to which the adhesive has been applied.

Figure 3:
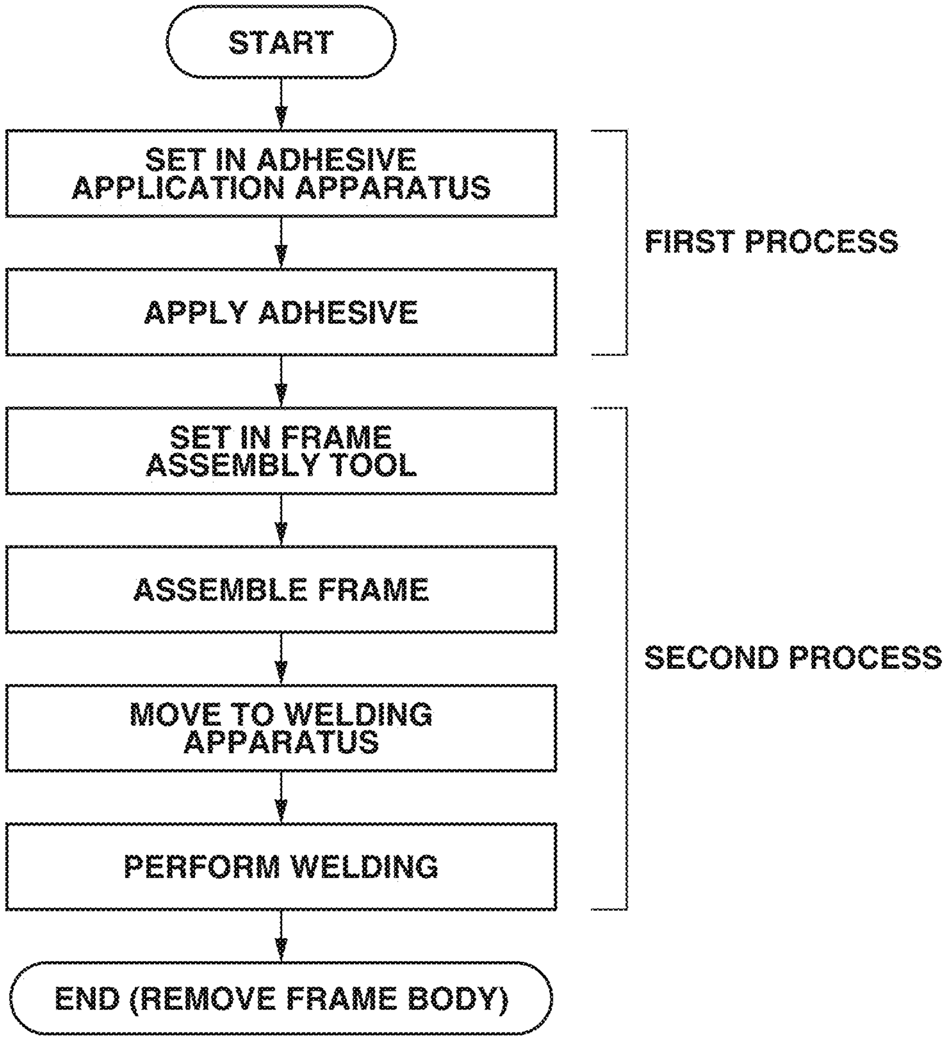
FIG. 3 is a flowchart of an assembly process of the frame of the image forming apparatus.

The process in the flowchart of FIG. 3 is executed by a human worker in charge of assembly and/or an automated robot operating in accordance with a program. Herein, the process of assembling the frame 200 by a human worker and an automated robot in cooperation with each other will be described.

Initially, the application process of applying an adhesive will be described. FIG. 3 illustrates the process. The human worker first sets the front side plate 27 and the back side plate 28 horizontally in an adhesive application apparatus. The both side plates are set in the application apparatus in the postures illustrated in FIGS. 4A and 4B. The adhesive is a two-pack acrylic adhesive, which is charged into two syringes 80 and 81 illustrated in FIG. 4B. The syringes 80 and 81 are connected to arms 82 and 83 of an automated application robot, respectively, and are held to be movable in the XYZ directions. The automated application robot is programmed to move the arms 82 and 83 to predetermined application places and apply a predetermined amount of adhesive.

Cross-shaped marks (not illustrated) are put on the application places in the front side plate 27 and the back side plate 28. Each cross-shaped mark is about 0.3 mm deep and about several millimeters long and wide, for example, by which the human worker and the camera-equipped automated application robot can recognize the adhesive application positions. The marks of several millimeters are sufficient, so that it is not necessary to perforate the metal plates unlike in the case of screw fastening. This eliminates a limitation on space for the adhesive application places, thus increasing the degree of freedom in the shape of the side plates.

Figure 4A:
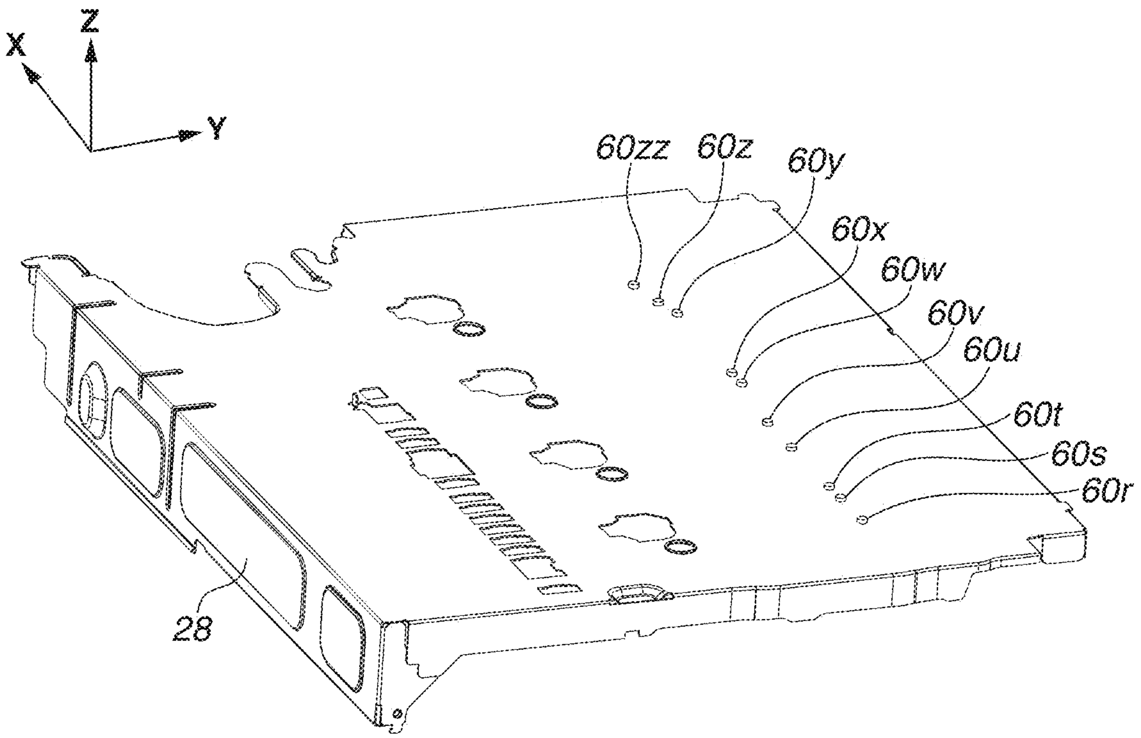
FIGS. 4A and 4B are diagrams illustrating an adhesive application process.
Figure 4B:
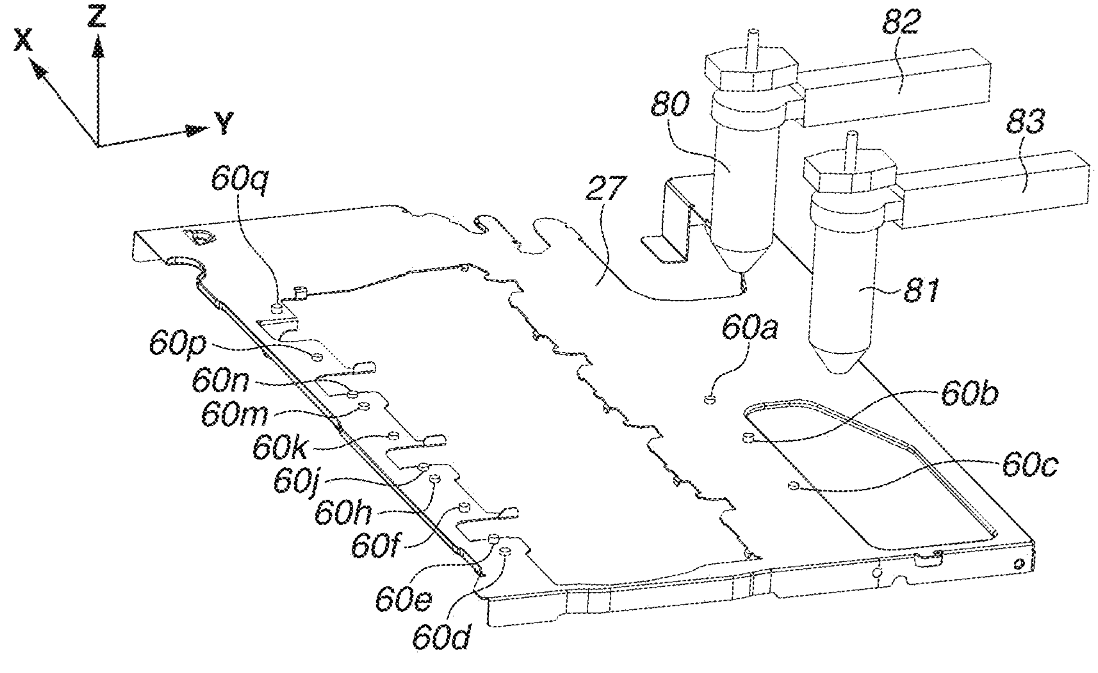

In the present embodiment, the adhesive is applied to the front side plate 27 at 13 places (60*a* to 60*q*), and to the back side plate 28 at 10 places (60*r* to 60*zz*), for a total of 23 places as illustrated in FIGS. 4A and 4B. The automated application robot is programmed to complete the adhesive application at one place in about several ten seconds. The use of the automated application robot resolves concerns about troublesomeness and failure to apply the adhesive, which are involved in manual application of the adhesive. The application of the adhesive to all the places is completed sufficiently before the hardening of the applied adhesive, so that it is possible to move to the next process of assembling the frame 200 in good time.

The viscosity of the adhesive in the present embodiment is as relatively high as about 10000 to 20000 mPa·s. Thus, even if the both side plates are shifted from the horizontal posture for application of the adhesive to the standing posture for the assembly of the frame 200, the adhesive does not immediately flow down on the both side plates.

Figure 5:
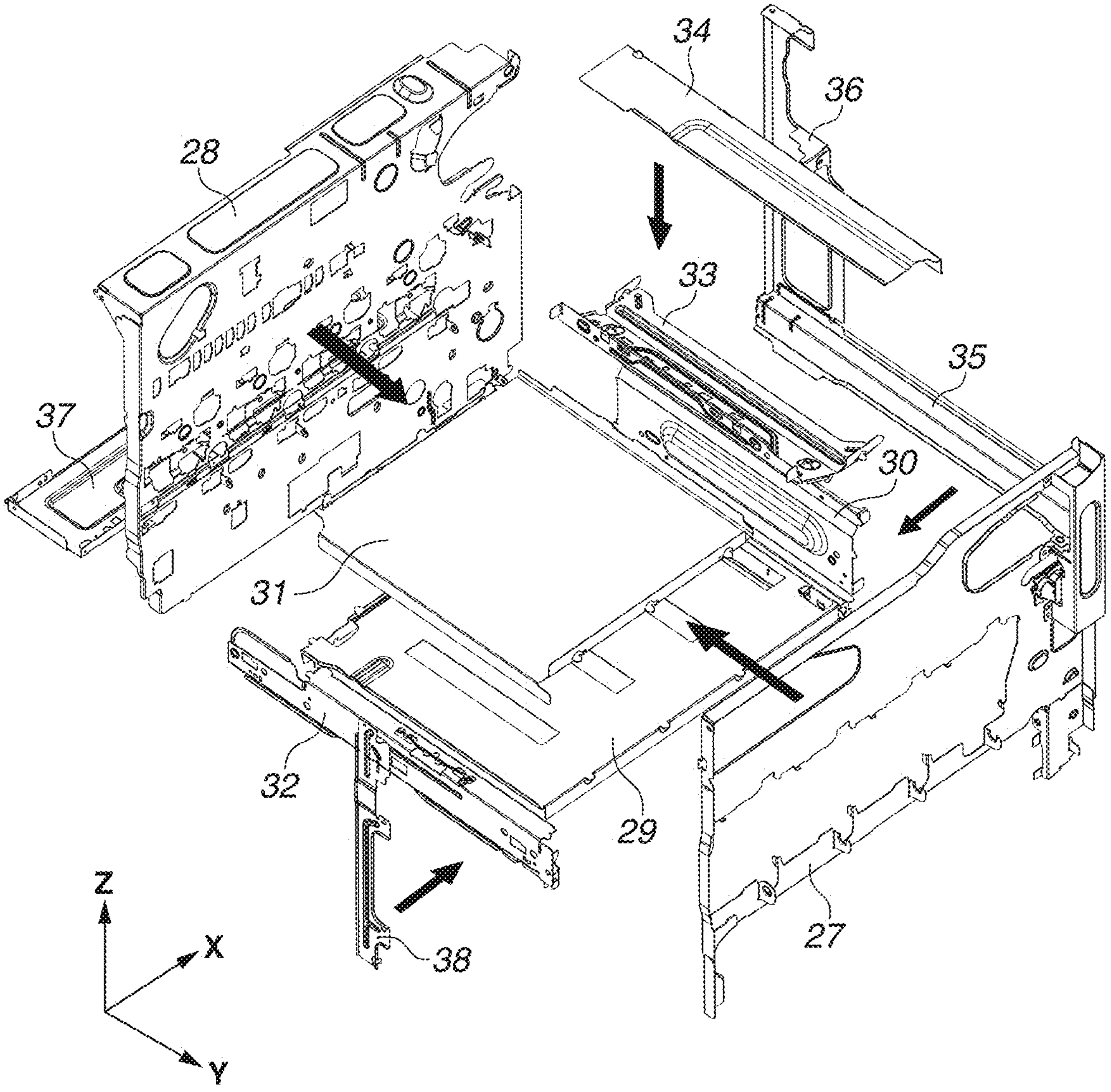
FIG. 5 is a diagram illustrating a frame assembly process.

Next, the process of assembling the front side plate 27 and the back side plate 28 will be described. FIG. 5 illustrates the postures of the metal plates including the both side plates with the adhesive applied, which are about to be assembled into the frame 200.

The metal plates are fixed to and retained at framing tools (not illustrated) by magnets or the like so that the metal plates are held in posture. After that, the metal plate holding parts of the framing tools are moved to engage the metal plates with each other in predetermined order in the directions of arrows in FIG. 5. All the metal plates in the assembled state are subjected to the welding process. For the order of assembly, the front side plate 27 and the back side plate 28 are initially engaged with each other in the direction of arrow (Y direction). The left lower stay 32 and the right lower stay 35 are then engaged with each other in the direction of arrow (X direction), and the right upper stay 34 is engaged in the direction of arrow (Z direction). Thus, the frame 200 is assembled.

In the welding process, the frame 200 is held in posture by the framing tools and is conveyed into a welding apparatus. In the present embodiment, the frame 200 is welded at about 50 places. All the members except for the main stay 29 and the substrate stay 31 are fastened by welding alone.

The automated welding robot is programmed to continuously execute the welding work.

Figure 6:
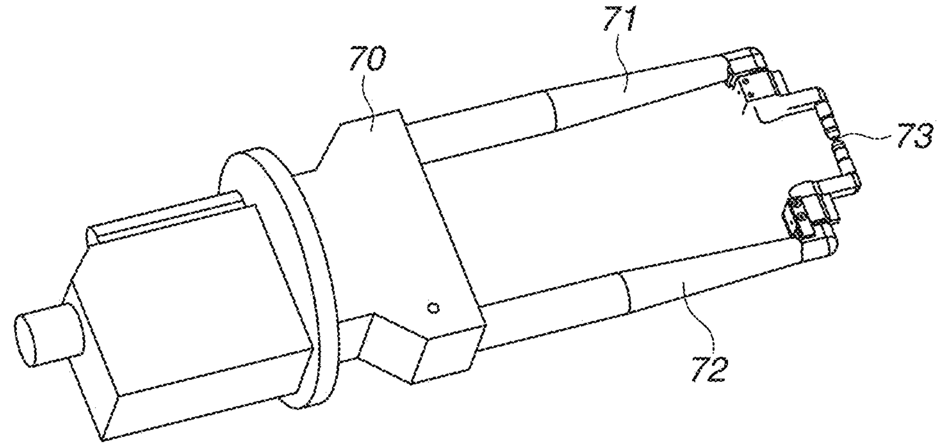
FIG. 6 is a three-dimensional view of an arm end part of a welding machine.

FIG. 6 illustrates an arm end part 70 of an automated welding robot in the present embodiment. The arm end part 70 includes two movable arm-shaped nozzles 71 and 72, and the metal plates are sandwiched and welded between ends 73 of the two nozzles 71 and 72.

Figure 7:
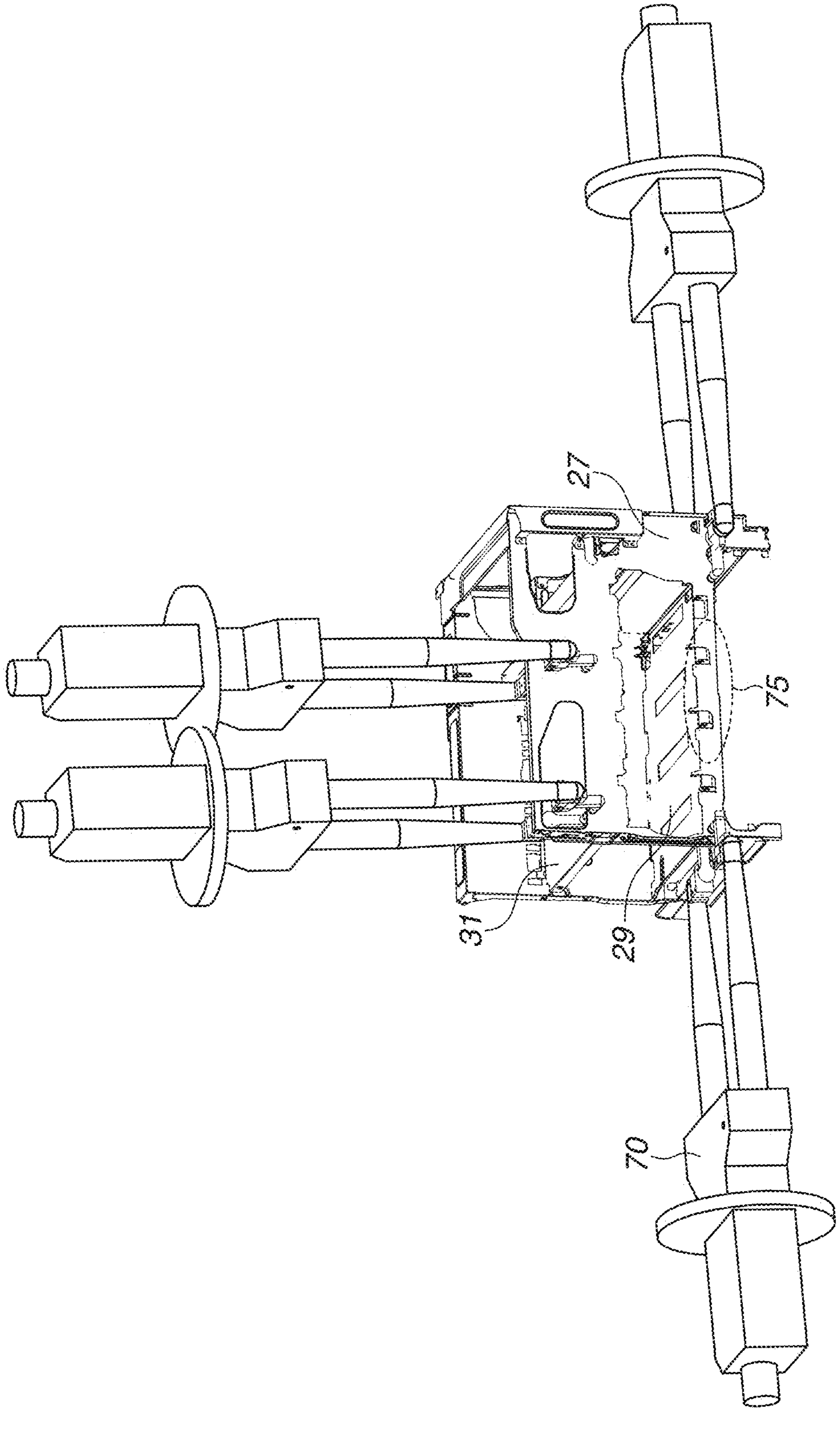
FIG. 7 is a diagram illustrating a frame welding process.

FIG. 7 illustrates the posture of the arm end part 70 of the automated welding robot at the time of welding the front side plate 27 and the main stay 29, and welding the front side plate 27 and the substrate stay 31. The arm end part 70 performs welding at a plurality of places while moving in order. FIG. 7 collectively illustrates the postures of the arm end part 70 at four welding points.

Figure 8:
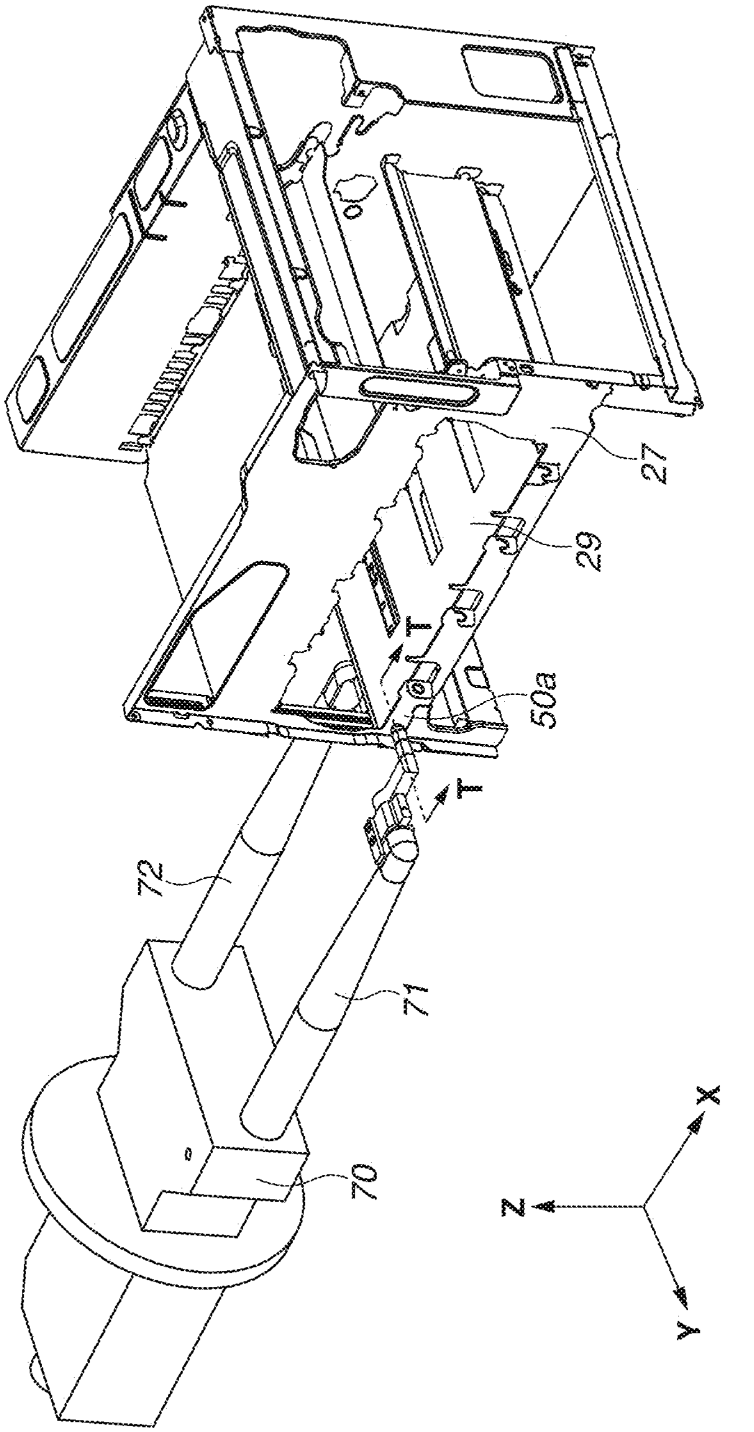
FIG. 8 is a diagram illustrating the posture of the arm end part in welding a front side plate and a main stay.
Figure 9:
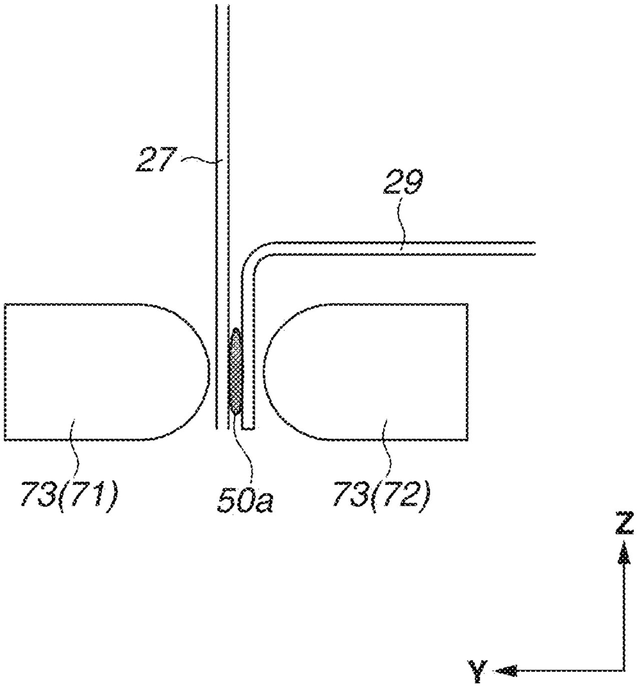
FIG. 9 is a cross-sectional view of the front side plate and the main stay that are being welded together.

FIG. 8 illustrates a posture of the arm end part 70 welding the front side plate 27 and the main stay 29. FIG. 8 illustrates the moment in time when the arm end part 70 of the automated welding robot is welding the two metal plates at a welding position 50*a*. FIG. 9 illustrates a T-T cross section of the arm end part 70 at that time. FIG. 9 illustrates a state in which the front side plate 27 and the main stay 29 are sandwiched between the ends 73 of the nozzles 71 and 72. Electric current can be flown into the ends 73 of the nozzles 71 and 72. Flowing the electric current between the nozzles 71 and 72 makes it possible to weld together portions of the metal plates sandwiched between the ends 73 of the nozzles 71 and 72.

Referring to FIG. 9, the welding position 50*a* cannot be further moved upward (toward the plus side of the Z direction) from the current position in the Z direction. This is because a predetermined amount of gap between the nozzle 72 of the automated welding robot and the main stay 29 in the Z direction is to be secured.

Figure 10A:
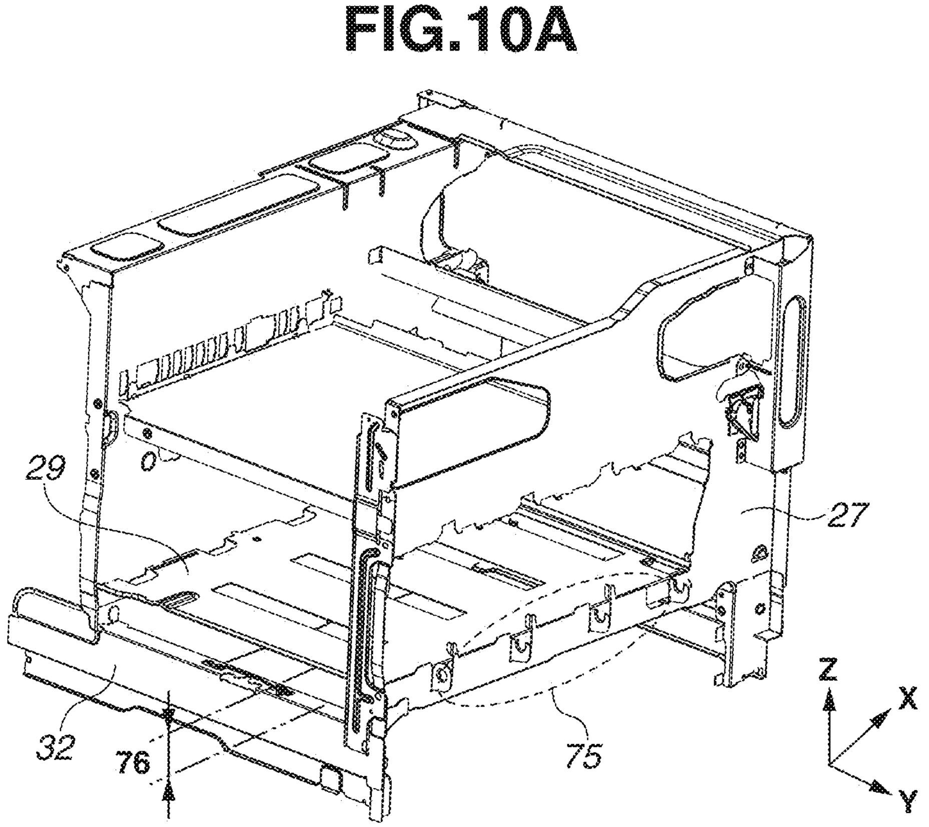
FIGS. 10A and 10B are diagrams illustrating the reason that the center part of the frame cannot be welded.
Figure 10B:
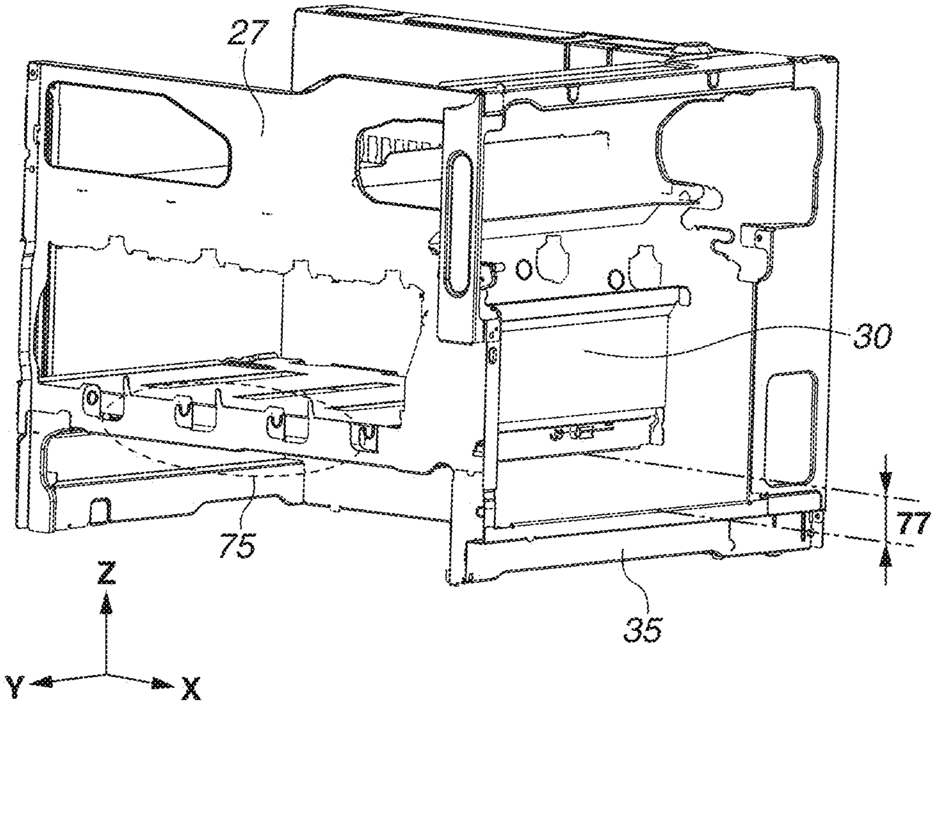

The use of the automated welding robot in such a manner enables two metal plates to be joined together with a high joint strength, without using screws. Meanwhile, it is difficult for the automated welding robot to access the central part 75 of the frame 200. In order to weld the central part 75 of the frame 200, the arm end part 70 is to be made to enter through a gap 76 between the main stay 29 and the left lower stay 32 illustrated in FIG. 10A. However, the gap 76 is small, so that the arm end part 70 cannot enter through the gap 76. It may be considered that the arm end part 70 is entered through a gap 77 between the feed stay 30 and the right lower stay 35 illustrated in FIG. 10B, but the gap 77 is also insufficient in size.

As described above, the frame 200 has been reduced in size along with the downsizing of the image forming apparatus 100, so that further widening the gaps 76 and 77 is difficult. There is also a limitation on the size reduction of the arm end part 70. Thus, a fastening means other than welding is to be taken on the central part 75 of the frame 200, so that an adhesive is used in the present embodiment.

Figure 11:
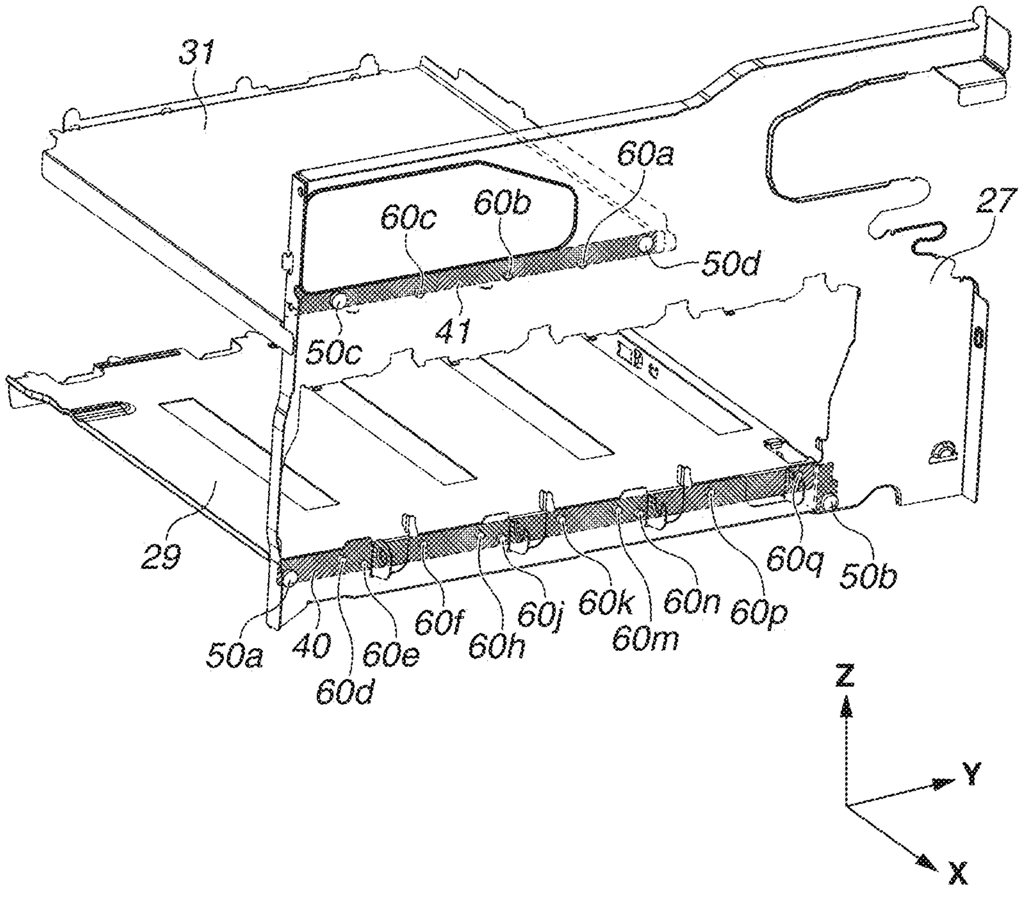
FIG. 11 is a diagram illustrating the welding positions and adhesive application positions in the front side plate and the main stay/substrate stay.

In the frame for which the application of an adhesive and welding have been completed in the above described manner, the regions of the metal plates in contact with each other will be described in detail. FIG. 11 illustrates a contact region 40 between the front side plate 27 and the main stay 29. Welding positions 50*a* and 50*b* are located near both ends of the contact region 40 hatched in FIG. 11. In a range between these two points, the adhesive is applied at ten places 60*d* to 60*q*. In other words, the front side plate 27 and the main stay 29 are joined together by welding and the adhesive.

In a contact region 41 between the front side plate 27 and the substrate stay 31, welding positions 50*c* and 50*d* are located near the both ends of the contact region 41. In a range sandwiched between the two points, the adhesive is applied at three places 60*a* to 60*c*. In other words, the front side plate 27 and the substrate stay 31 are joined together by welding and the adhesive.

Figure 12:
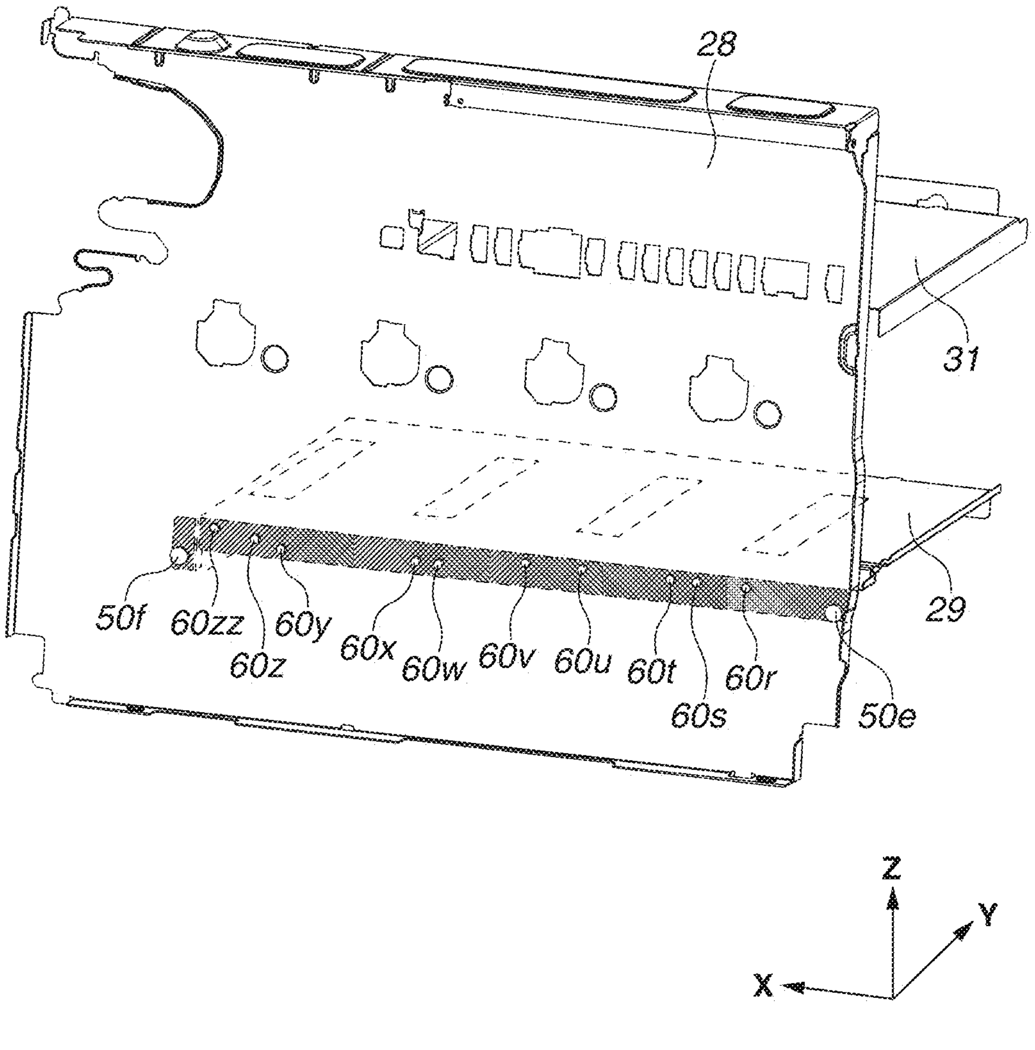
FIG. 12 is a diagram illustrating the welding positions and adhesive application positions in a back side plate and the main stay.

In a contact region 42 between the back side plate 28 and the main stay 29 illustrated in FIG. 12, welding positions 50*e* and 50*f* are located near the both ends of the contact region 42. In a range sandwiched between the two points, the adhesive is applied at ten places 60*r* to 60*zz*. In other words, the back side plate 28 and the main stay 29 are joined together by welding and the adhesive.

Figure 13:
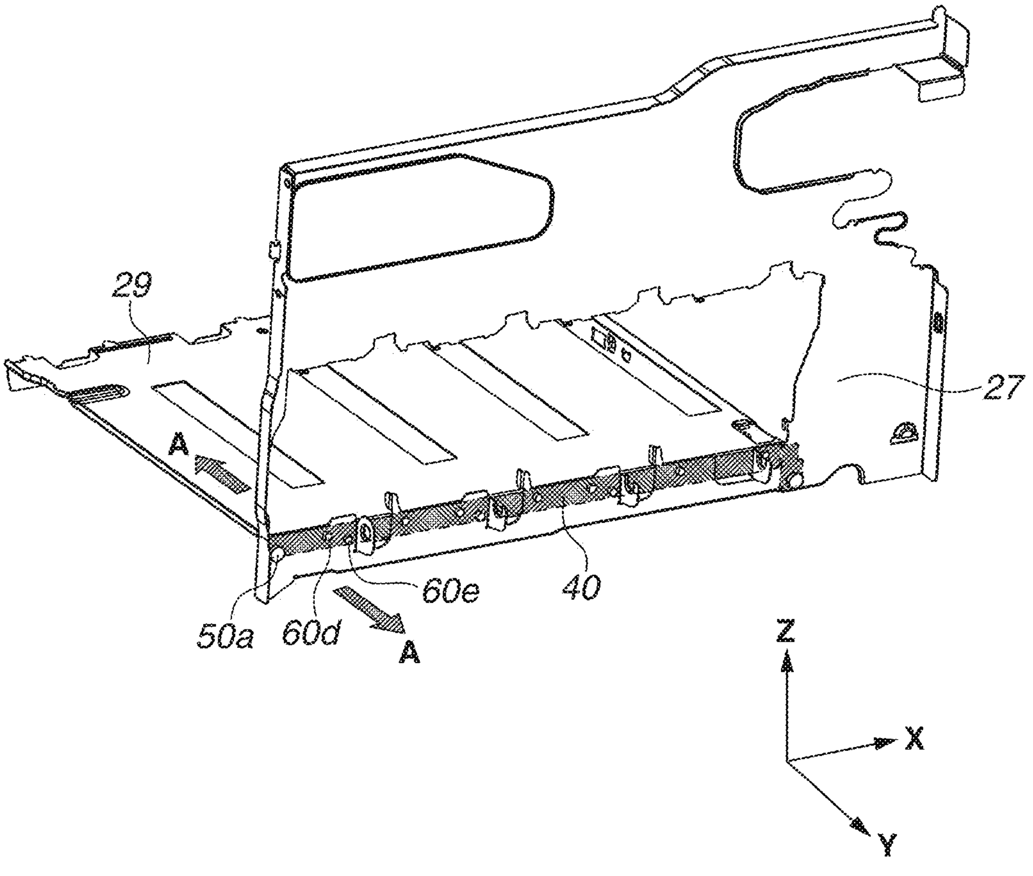
FIG. 13 is a diagram illustrating a peeling force acting on the front side plate and the end part of the main stay.

The peel resistance of the joint between metal plates will be described. FIG. 13 illustrates a case where peeling force acts in the directions of arrows A, as an example of the peeling force acting on the front side plate 27 and the main stay 29. As illustrated in FIG. 13, with the peeling force acting on the end portions of the front side plate 27 and the main stay 29, in general, a maximum value of the peeling force concentrates on an end portion of the left side (minus side in the X direction) of the contact region 40. However, since the front side plate 27 and the main stay 29 are welded at the welding position 50*a*, the front side plate 27 and the main stay 29 are sufficiently resistant against a peeling force at a predetermined level. Thus, large peeling force does not act directly at the adhesion positions 60*d* and 60*e* and other positions on the right of the welding position 50*a*. This compensates for peel resistance which is not that high against the force of the direction of peeling of the adhesive.

Figure 14:
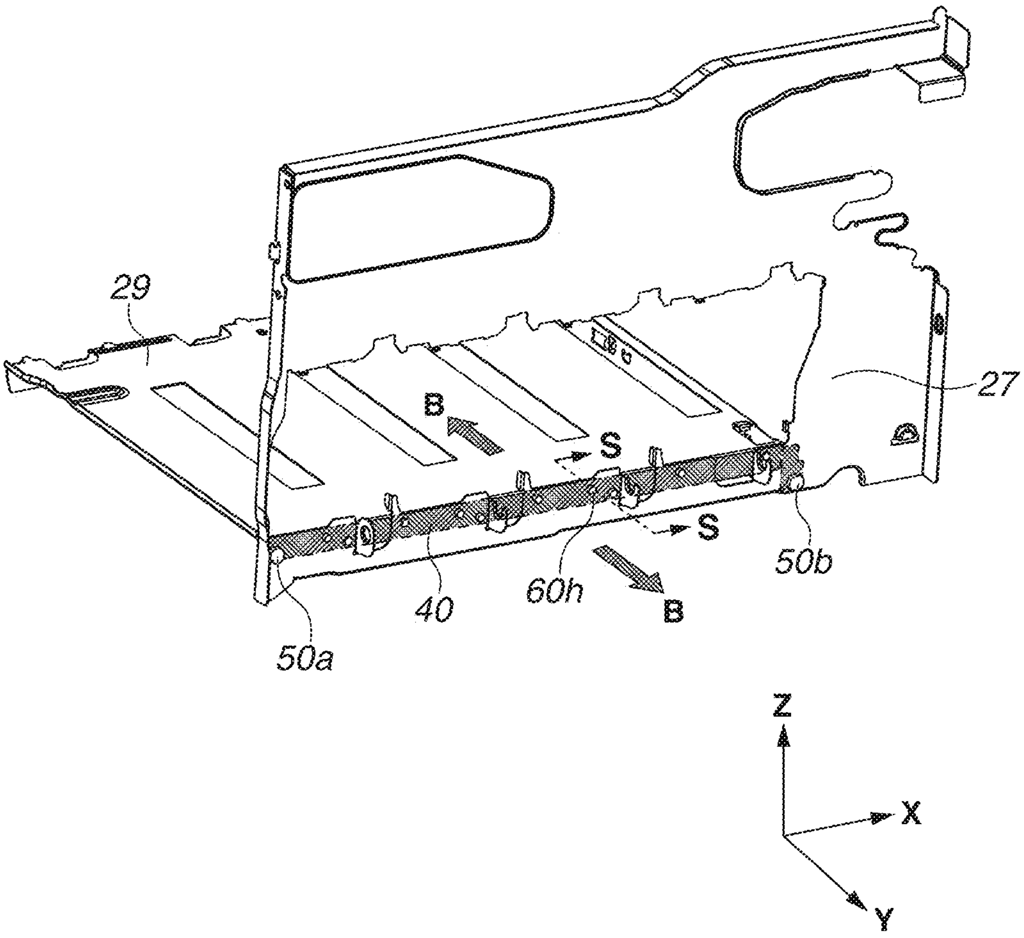
FIG. 14 is a diagram illustrating a peeling force acting on the front side plate and the center part of the main stay.
Figure 15A:
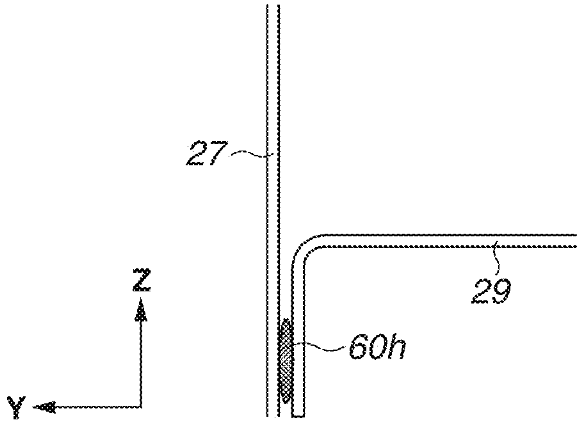
FIGS. 15A, 15B, and 15C are cross-sectional views of the front side plate and the main stay on which peeling force is acting.
Figure 15B:
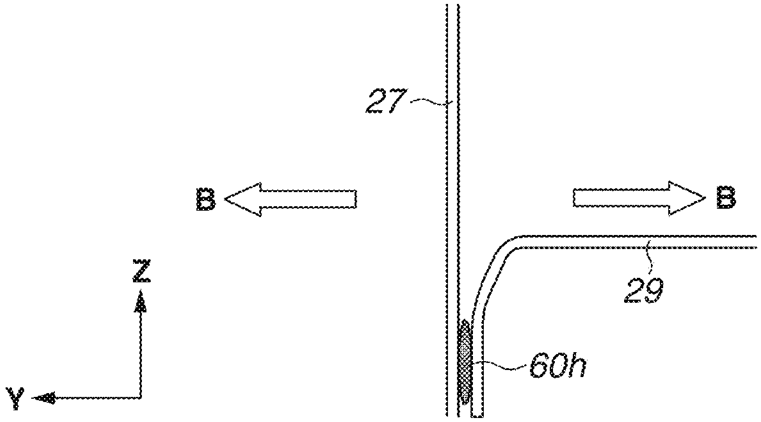
Figure 15C:
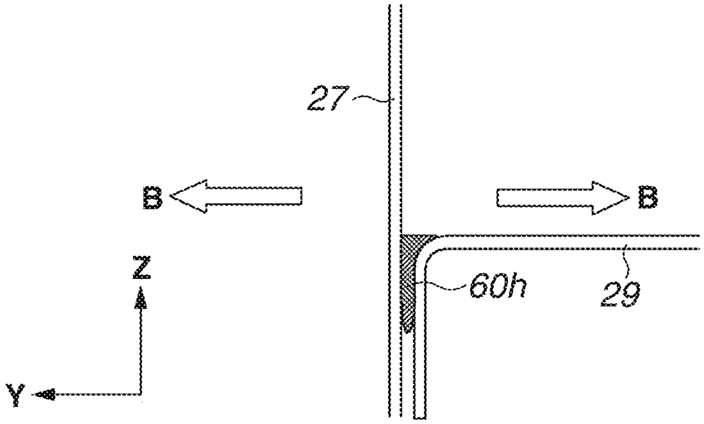

As another example, the case where peeling force B acts near the center of the contact region 40 in FIG. 14 between the front side plate 27 and the main stay 29 will be discussed. This case will be described with further reference to FIGS. 15A to 15C, which are views taken along a cross-sectional line S-S. Referring to FIG. 15A, a portion of the main stay 29 is bent to lie along the surface of the front side plate 27 on a flat plane to form a bent portion. FIG. 15A illustrates a state where an adhesive 60*h* is applied to between the front side plate 27 and the main stay 29. In this state, if the peeling force B acts as illustrated in FIG. 15B, the bent portion of the main stay 29 initially becomes deformed, and then the force concentrates on the upper end of the adhesive 60*h* so that the adhesive 60*h* becomes likely to peel from the upper end. Thus, in the present embodiment, the application position of the adhesive is adjusted to be set at the root of the bent portion of the main stay 29, as illustrated in FIG. 15C. Thus, although the peeling force B transfers to the main stay 29, the bent portion of the main stay 29 does not become deformed. The peeling force B is dispersed in the entire region to which the adhesive 60*h* has been applied, so that the adhesive 60*h* does not peel. In particular, since the region at the root of the bent portion cannot be fastened by welding or screws, the advantage of the adhesive can be obtained.

The use of the adhesive eliminates the need for perforation in the metal plates unlike in the case of fastening by screws as described above, and achieves the smooth flat shape without welding marks that would be left in the case of welding. This makes it possible to secure a favorable surface state and high rigidity of the semi-outer appearance part to be accessed by the user at an insertion port of the cartridge as in the present embodiment.

In the present embodiment, although it takes about several minutes from the start to end of welding the frame, the applied adhesive becomes hardened at the timing of completion of the welding to secure the practical strength. This eliminates the need to separately secure the waiting time until the adhesive reaches the practical strength, which is efficient in production. That is, the subsequent steps of further attaching members to the frame 200 to assemble the image forming apparatus 100 are not interrupted.

There is no hole or space for an automated welding robot to access in the range sandwiched between the plurality of welding positions 50*a* to 50*f* described above. Thus, it has been conventionally necessary to use tightening members, such as screws. However, the use of the adhesive as in the present embodiment enables efficient fastening of the metal plates.

As compared with the screw fastening method, the adhesive is continuously applied by an automated application robot, so that the working time is shortened and the material expenses are reduced, thus achieving cost reduction. It is found that the strength of the adhesive-joined metal plates against the force in the direction of shearing is 5 to 20 times greater than the shearing strength with screws (that is, the strength of the metal plates sandwiched by screws and maintained by frictional force against the direction of shearing). Therefore, it is also possible to eliminate the occurrence of phenomenon called screw misalignment caused by impact, which is a disadvantage of fastening members, such as screws.

Although the adhesive is not that high in strength against the force in the direction of peeling, the two metal plates are welded near the both ends of the contact region, so that it is possible to prevent the metal plates from becoming broken due to the peeling of the adhesive.

The adhesive itself is a non-conductive member, so that fixing of the stay and the side plate at all places results in formation of a thin film of the adhesive between the stay and the side plate, and electric current may not flow smoothly from the stay to the side plate. In other words, no ground may be established. The substrate stay 31 supporting the high-voltage power supply substrate 13 is to be securely grounded, so that in the present embodiment, the front side plate 27 and the substrate stay 31, in particular, are joined together by welding at the both ends of the contact region 41

(illustrated in FIG. 11) to prevent such a failure. Electrical conductivity is secured at the welding positions 50*c* to 50*d*.

The frame 200 of the present embodiment includes combinations of metal plates joined together by both welding and an adhesive and combinations of metal plates joined together only by welding. Optimum fixing method can be selected for the members supported by the metal plates and the configuration of the frame.

As above, according to the present embodiment, in a structure of a frame of an image forming apparatus assembled by using an adhesive, it is possible to achieve weight reduction of the frame while securing the rigidity of the frame in the direction of peeling of the adhesive.

In the present embodiment, two metal plates are joined together by using an adhesive in addition to an automated welding robot, thus achieving weight reduction of the frame while securing the rigidity of the frame in the direction of peeling of the adhesive. In particular, since the both metal plates are welded together in such a manner that the positions at which the two meatal plates are joined with the adhesive are sandwiched, the force acting in the direction of peeling is received mainly at the welding positions. Thus, the adhesive is more unlikely to peel than in the conventional technique.

A welding machine typified by an automated welding robot has a limited access to a region to enter, in the present exemplar embodiment, the welding positions and adhesive application positions in the two metal plates are adequately designed.

In other words, as described above, the welding is performed in such a manner that positions at which the two meatal plates are joined with the adhesive are sandwiched. Thus, the welding positions are closer to an end of the metal plates than the adhesive application positions. This allows the welding machine, such as an automated welding robot, to relatively easily access the welding positions.

Modification Examples

In the above-described embodiment, marks indicating the adhesive application positions are placed on the metal plates. The metal plates may be subjected to a drawing process or an embossing process at the application positions as appropriate. It can be expected that subjecting both or at least one of two metal plates to be joined together to these processes produces an advantageous effect of improving the adhesion between the metal plates. Whether to perform these processes can be determined as appropriate in consideration of the balance of the space and the degree of freedom of shape.

Figure 16:
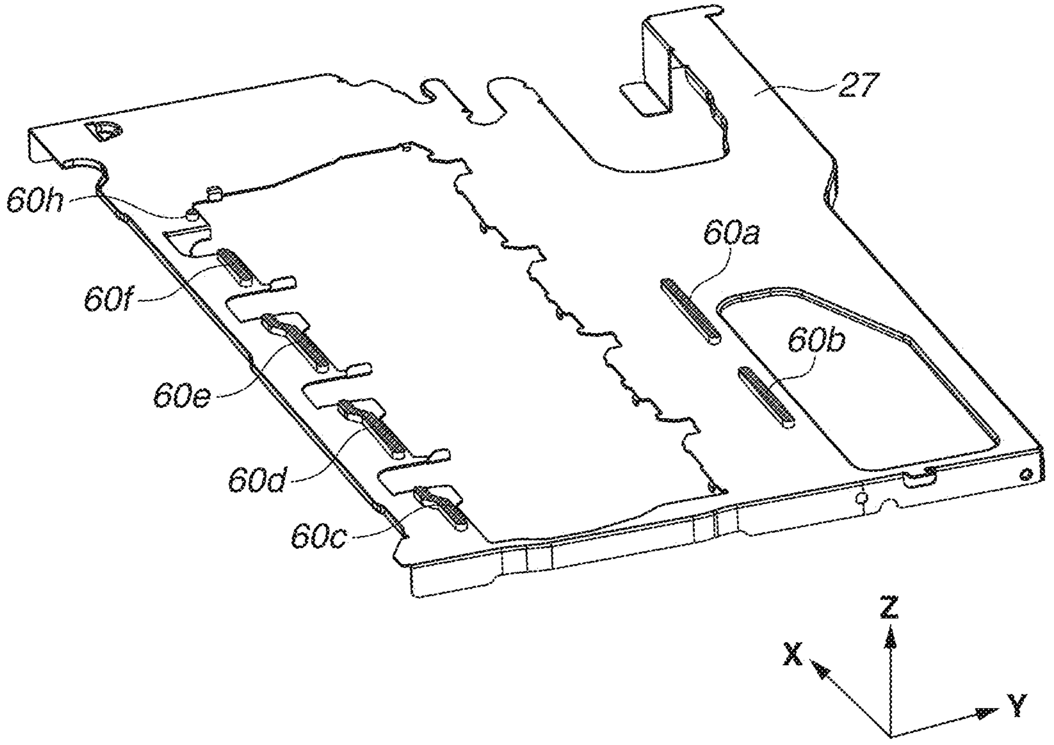
FIG. 16 is a diagram illustrating an adhesive application process in a modification example.

In the above-described embodiment, the adhesive is applied in a dot pattern to the both side plates at a plurality of places. However, the present disclosure is not limited to this. The adhesive may be applied in a linear pattern as illustrated in FIG. 16. As compared with the process described in FIG. 4, the linear pattern increases the adhesion range to make a higher-rigidity frame.

Figure 17:
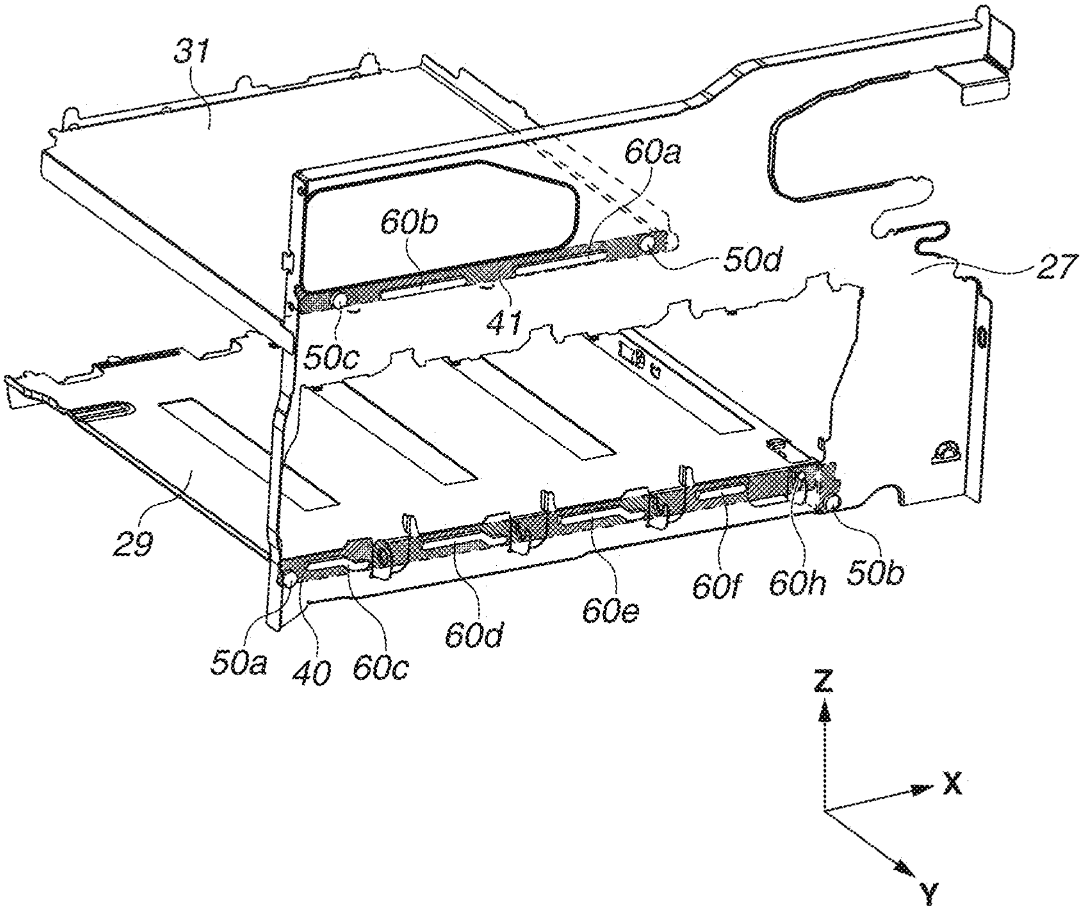
FIG. 17 is a diagram illustrating the welding positions and adhesive application positions in a front side plate and a main stay/substrate stay in the modification example.

FIG. 17 illustrates the state of the contact region 40 between the front side plate 27 and the main stay 29, and the state of the contact region 41 between the front side plate 27 and the substrate stay 31. There is no hole or space for an automated welding robot to access in the region sandwiched between the welding positions 50*a* to 50*f*, so that fastening members, such as screws, are to be used in typical technique. However, the use of the adhesive as in the present modification example enables the metal plates to be efficiently joined together.

In the above-described embodiment, the adhesive is applied to the metal plates in advance, and then the metal plates are assembled and welded. However, the present disclosure is not necessarily limited to this order. After the welding process, the adhesive may be injected into a gap between the two metal plates. For example, it can be expected that injecting the adhesive later into the root of the bent portion of the main stay 29 illustrated in FIG. 15C has the effect of applying an adhesive. In the case of injecting an adhesive, an adhesive with a relatively low viscosity of about 3000 to 10000 mPa·s is used to penetrate between the metal plates by the agency of gravitation and capillary action.

In the above-described embodiment, as illustrated in FIG. 11, the front side plate 27 and the main stay 29 are welded at the both end parts of the contact region 40, for example. However, the present disclosure is not limited to this. The adhesive may be applied to the range sandwiched between two welding positions and may be further applied to the outside of the welding positions (end sides). In other words, the present disclosure does not exclude configurations in which the adhesive is applied to the range not sandwiched between two welding positions.

In relation to the above-described embodiment, the electrophotographic image forming apparatus 100 has been described. However, the present disclosure is not limited to this. The present disclosure is also applicable to the assembly of a frame of an image forming apparatus of a different printing type, such as inkjet type or offset printing type.

According to the present disclosure, it is possible to, in a configuration in which a frame of an image forming apparatus is assembled by using an adhesive, achieve weight reduction of the frame while securing the rigidity of the frame in the direction of peeling of the adhesive.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:

1. An image forming apparatus comprising:

a first metal plate;

a second metal plate;

an image forming unit configured to form an image on a recording material and configured to be between the first metal plate and the second metal plate; and a third metal plate that is located between the first metal plate and the second metal plate and is joined to the first metal plate and the second metal plate, wherein the first metal plate and the third metal plate are welded together at a plurality of welding positions, wherein an adhesive is between the first metal plate and the third metal plate so that the first metal plate and the third metal plate are joined by the adhesive, wherein the adhesive is between two welding positions of the plurality of welding positions.

2. The image forming apparatus according to claim 1, wherein a bent portion is formed by bending a portion of the third metal plate to lie along a surface of the first metal plate, and wherein the adhesive is applied to the bent portion of the third metal plate.

3. The image forming apparatus according to claim 1, wherein the second metal plate and the third metal plate are welded together at a plurality of welding positions, wherein an adhesive is between the second metal plate and the third metal plate so that the second metal plate and the third metal plate are joined by the adhesive and between two welding positions of the plurality of welding positions.

4. The image forming apparatus according to claim 1, wherein the image forming unit includes a cartridge including a photosensitive member, a charging unit configured to electrically charge the photosensitive member, and a developing unit configured to develop an electrostatic latent image formed on the photosensitive member, and the cartridge is detachably attached to an apparatus main body of the image forming apparatus, wherein the first metal plate and the second metal plate are configured to position the cartridge, and wherein the third metal plate supports the cartridge.

5. The image forming apparatus according to claim 1, further comprising a power supply substrate configured to generate a voltage to be applied to the image forming unit, and wherein the third metal plate supports the power supply substrate.

6. An assembling method for a frame of an image forming apparatus, the assembling method comprising:

applying an adhesive to respective surfaces of a first metal plate and a second metal plate;

performing assembly such that the first metal plate and the second metal plate sandwich a third metal plate and that the first metal plate and the second metal plate are joined to the third metal plate with the adhesive;

welding the first metal plate and the third metal plate at least at two positions such that a position at which the first metal plate and the third metal plate are joined together with the adhesive is between the two positions; and welding the second metal plate and the third metal plate at least at two places such that a position at which the second metal plate and the third metal plate are joined together with the adhesive is between the two places.

* * * * *